Jan. 16, 1923. 1,442,419.
H. G. ASHWORTH ET AL.
DRYING MACHINE FOR WORSTED TOPS, YARN, ETC.
FILED SEPT. 17, 1921. 3 SHEETS—SHEET 3.
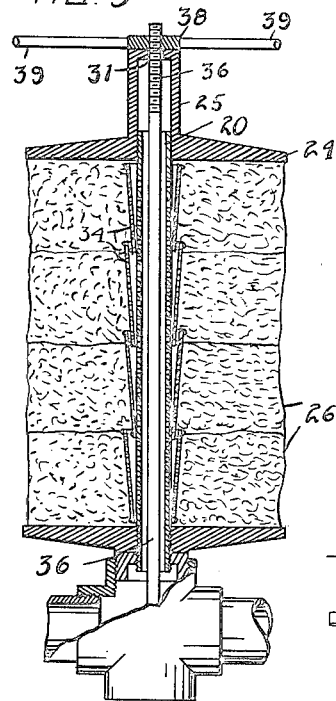
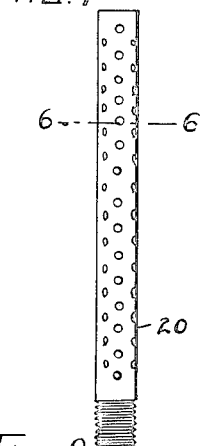
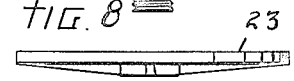
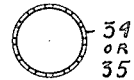
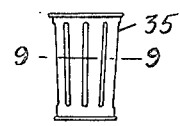
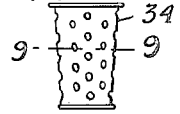
Inventor
Harry G. Ashworth,
and
Asa Ashworth,
By S. Arthur Baldwin,
Attorney Patented Jan. 16, 1923.

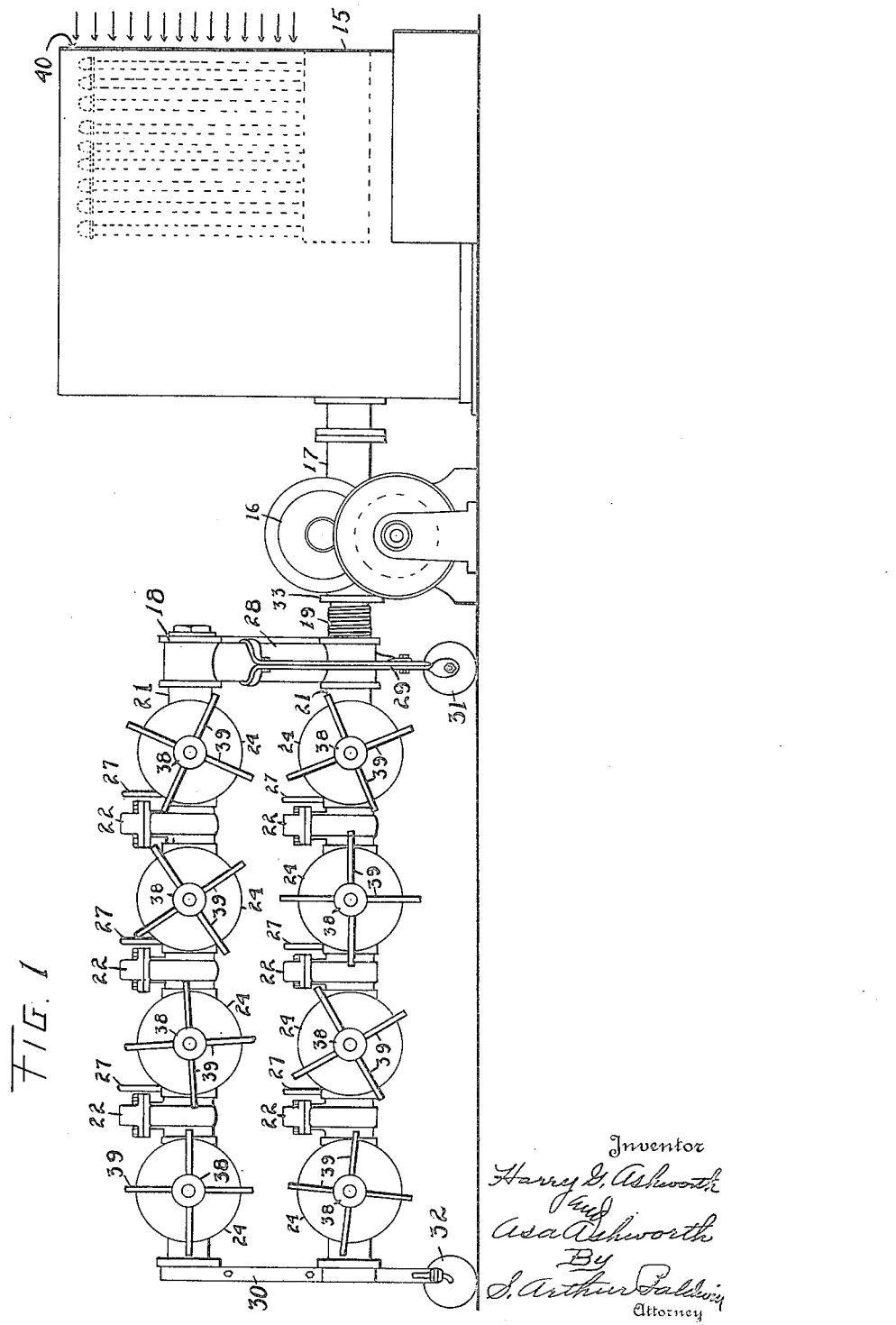

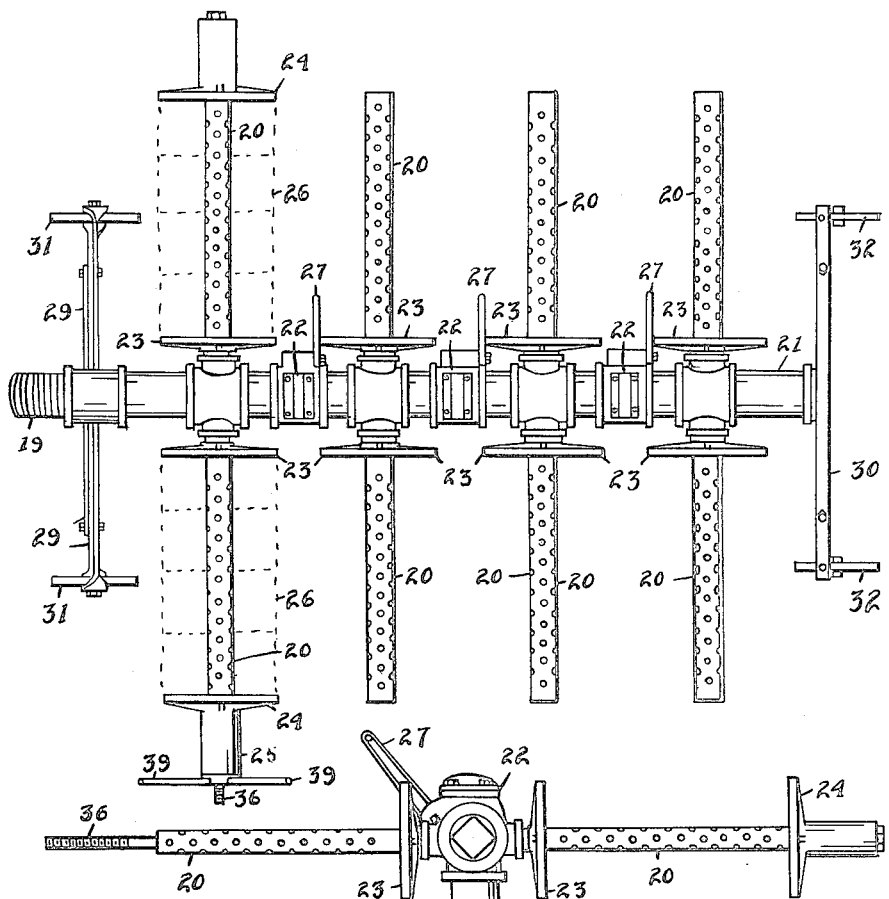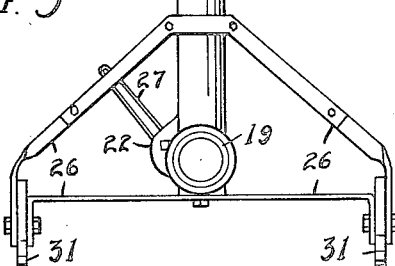

1,442,419.

UNITED STATES PATENT OFFICE.

HARRY G. ASHWORTH AND ASA ASHWORTH, OF SALAMANCA, NEW YORK, ASSIGNORS, BY DIRECT AND MESNE ASSIGNMENTS, TO INTERNATIONAL TEXTILE DEVICES, INC., OF SALAMANCA, NEW YORK.

DRYING MACHINE FOR WORSTED TOPS, YARN, ETC.

Application filed September 17, 1921. Serial No. 501,253.

*To all whom it may concern:*

Be it known that we, HARRY G. ASHWORTH and ASA ASHWORTH, citizens of the United States, residing at the city of Salamanca, in the county of Cattaraugus and State of New York, have invented certain new and useful Improvements in Drying Machines for Worsted Tops, Yarn, Etc., of which the following, taken in connection with the accompanying drawings, is a specification.

The invention relates to drying devices; and the object of the improvement is to provide a drying device for worsted tops and similar articles by means of which air heated to a desired temperature may be forced through said tops, drying said tops from the inside out, thereby doing away with the need of centrifugals and other machines for drying the worsted tops and regulating the temperature so as not to overheat the wool fibre in drying the same, providing the air at a temperature from 100 to 120 degrees Fahrenheit under force so that the moisture in the tubular wool fibre is quickly replaced by the warm air, keeping said wool fibre pliant and soft, not permitting said wool fibre to become shriveled by heat and consequently harsh and brittle, thereby losing its strength; and the invention consists in the novel features and combinations hereinafter set forth and claimed.

In the drawings, Figure 1 is a side elevation of the preferred form of our drying machine showing the heater and fan or blower for the air and the drying machine and its connection to said fan and heater. Fig. 2 is a top plan view of the drying machine showing the tops upon one pair of spindles in dotted outline, also showing the perforate tubular spindles and the valvular control between the pairs of spindles; and Fig. 3 is an end elevation of the drying machine showing the connecting end toward the heater and fan. Fig. 4 is an elevation of one of the clamping bolts for a pair of spindles. Fig. 5 is a top plan view partially in section of one of the pairs of spindles with the clamping bolt extending therethrough showing the tops supported therein. Fig. 6 is a crosswise sectional view at line 6—6 in Fig. 7; and Fig. 7 is a detail perspective view of one of the perforate tubular spindles. Fig. 8 is an edgewise elevation of one of the clamping plates for the tops at the inner end of the perforate spindle. Fig. 9 is a sectional view at line 9—9 in Fig. 10 or Fig. 11 of one of the perforate conical shaped spools for the tops; and Fig. 10 is an elevation of one of said spools with slotted openings therethrough, and Fig. 11 is a similar elevation with perforations therethrough, the perforate form of spool being preferred on account of the stronger construction.

Like characters of reference refer to corresponding parts in the several views.

The numeral 15 designates the heater for the air which is connected to the blower or fan 16 by pipe 17, which fan 16 is connected to the drying machine 18 by a removable flexible joint connection 19.

The drying machine 18 consists of a plurality of tubular perforate spindles 20 for the tops, preferably arranged in pairs opposite one another and connected by suitable pipe couplings to a larger feed pipe 21. The perforate tubular spindles 20 preferably extend out horizontally from the feed pipe 20, which feed pipe may have any number of pairs of spindles 20 and is preferably arranged with a cut-off valve 22 between the different pairs of spindles so that one or more pair may be used as desired.

The feed pipe 21 may also be multiplex, one feed pipe 21 being preferably placed above the other with the perforate tubular spindles 20 extending out therefrom in similar horizontal arrangement. Each of the pairs of tubular spindles 20 has the clamping plate 23 on its inner end, or adjacent the coupling to the feed pipe 21. A capping outer clamping plate 24 has a tubular central portion 25 to be received over the end of the perforate tubular spindle 20 to thereby cap the tubular spindle 20 and clamp the tops 26 between the clamping plates 23 and 24.

The valves 22 are preferably of the gate valve form so that they can be quickly opened or closed by means of the levers 27. The feed pipes 21 are preferably connected by a stand or vertical pipe 28 and mounted upon a strong front frame or bracket support 29 and rear frame or bracket support 30 which have front wheels 31 and rear wheels 32 rotatably mounted on their downwardly extending outer ends, thereby making a truck form of support for the drying machine which can be easily moved, either loaded or unloaded, to different portions of the dye house. The coupling 19 is preferably flexible so that it can be quickly and easily attached to the end of the pipe 33 connecting to the blower 16.

In order to operate the drying machine, it may be wheeled to the dyeing vat, and the freshly dyed tops with the dyeing liquid therein may be loaded from the dyeing vat onto the tubular perforate spindles 20, usually from four to five of said tops, or "cheeses" as called in the dye house, on each spindle 20. The perforate spindles 20 pass through the perforate spools 34 or 35, the inner clamping plate 23 holding the tops firmly in position for compression thereagainst, and the capping outer clamping plate 24 slips over the end of the perforate tubular spindles 20 as shown in section in Fig. 5. The clamping bolt 36 is then inserted through the tubular portions 25 of the clamping cap plates 24, holes 37 being provided in the ends of the tubular portions 25 of said clamping plates 24, and the multiple armed nut or hand wheel 38 is provided for the threaded end of the clamping bolt 36 so that strong pressure may be brought to bear upon the tops 26 by means of the clamping plates 23 and 24 and the leverage of the arms 39 on the hand wheel 38, thereby pressing out the first dripping moisture from said tops and giving greater density to the same.

As soon as the drying machine is loaded, it is wheeled to the blower 16 and attached thereto, and the air is drawn through the open side 40 of the heater 15, as shown by the arrows in Fig. 1, by the blower 16 and forced through the feed pipes 21 and perforate tubular spindles 20 and spools 34, thence out through the tops 26, gradually drying the moisture therefrom, beginning the drying process on the inner side and progressing to the outer side, so that when the outer surface of the tops feels sufficiently dry, it is known that the entire top or cheese is dry and ready for the next step in the process of yarn making.

What is claimed as new is:

1. In a drying device, in combination with a source of air supply, a feed pipe for said air, tubular perforate spindles attached horizontally in opposite pairs to said feed pipe to balance one another, said spindles being adapted to receive worsted tops on perforate spools, means for clamping said worsted tops on said spindles to force said air through said tops to dry the same, and gate valves between said pairs of tubular perforate spindles to control the size of the drying machine.

2. In a drying device, in combination with a fixed source of air supply, a portable carrier for the articles to be dried, including a hollow perforated part upon which the articles are supported and a removable connection between the carrier and the source of air supply to allow the carrier to be moved away from said source of air supply after drying said articles.

3. In a drying device, in combination with a fixed source of air supply, a portable carrier for the articles to be dried, including a hollow perforated part upon which the articles are supported, a removable connection between the carrier and the source of air supply to allow the carrier to be moved away from said source of air supply after drying said articles.

4. In a drying device in combination with a fixed source of air supply, a portable carrier for the articles to be dried, means to removably support the articles on the carrier, means to conduct air to the articles to dry same, and a removable connection between the air conducting means of the carrier and the source of air supply to allow the carrier to be disconnected and moved away from the source of air supply after drying of the articles.

5. In a drying device in combination with a fixed source of air supply, a portable carrier for the articles to be dried, and a removable connection between the carrier and the source of air supply to allow the carrier to be disconnected and moved away from the source of air supply after drying of the articles.

6. In a drying device, a portable carrier having ground engaging supports, a main pipe carried by the supports, means to connect the main pipe to a source of air supply, and lateral perforated pipes carried by the main pipe to receive the articles to be dried thereon.

7. In a drying device a portable carrier having ground engaging supports, a pair of connected main pipes carried by the supports, means to connect the pipes to a source of air supply, lateral perforated pipes carried by each of the main pipes to receive the articles to be dried thereon, and means to removably connect the articles to the lateral pipes.

8. In a drying device, a portable carrier having spaced ground engaging supports, a conduit connecting the supports, perforated hollow elements connected to the conduit to receive the articles to be dried, and means to connect the conduit to a source of air supply.

9. In a drying device, a member having means for attachment to a source of air supply, tubular perforated spindles carried by the member and freely disposed therebeyond for receiving yarn tops thereon, means at the inner ends of the spindles to abut the inner ends of the yarn tops, means on the outer ends of the spindles to engage the outer ends of the yarn tops to compress same against the means engaging the inner ends of the yarn tops, and hand grips carried by the means on the outer ends of the spindles to allow of instantaneous adjustment of the pressure exerted on the yarn tops and similarly removal of the yarn tops from the spindles.

10. In a drying device, a portable carrier having ground engaging supports, a main pipe connecting said supports and with the latter forming a frame for the carrier, means to removably connect the main pipe to a source of air supply, and lateral perforated pipes connected to the main pipe for receiving the articles to be dried.

11. In a drying device, a main pipe having an inlet connected to a source of air supply, lateral perforated pipes connected to the main pipe at spaced intervals between the lateral pipes, and valves in certain of the spaces between the lateral pipes to allow of selective cutting off of the lateral pipes furthest from the inlet of the main pipe.

12. A drier including in combination with a source of air supply, ground engaging members, hollow means connecting said members to constitute a frame therewith, means to conduct air from the source of supply to said hollow means, and article holding means communicating with the hollow means.

In testimony whereof we have affixed our signatures in the presence of two witnesses.

ASA ASHWORTH.
HARRY G. ASHWORTH.

Witnesses:
 MURIEL E. STEFFENHAGEN,
 MARGARET A. HARVEY.